Patented July 10, 1934

1,965,818

UNITED STATES PATENT OFFICE 1,965,818

MANUFACTURE OF NITRO-ANTHRA-QUINONE-SULPHONIC ACID

William A. Adamson, South Milwaukee, Wis., assignor to E. I. du Pont de Nemours & Company, Wilmington, Del., a corporation of Delaware No Drawing. Application April 6, 1933, Serial No. 664,773

10 Claims. (Cl. 260—57)

This invention relates to the purification of nitro-sulphonic acids of anthraquinone. More particularly, this invention deals with the purification of 1-nitro-anthraquinone-6-sulphonic acid when manufactured on a large scale. The invention, however, is applicable also to the large scale manufacture and purification of 1-nitro-anthraquinone-5-sulphonic acid, as will appear more fully hereinafter.

1-nitro-anthraquinone-6-sulphonic acid is a valuable intermediate for dyestuffs, and generally finds its primary utility in the manufacture of 1-nitro-6-chloro-anthraquinone by the action of dilute hydrochloric acid in the presence of an alkali-metal chlorate.

The 1-nitro-anthraquinone-6-sulphonic acid itself is generally manufactured on a large scale by reacting with nitric acid upon a solution of beta-anthraquinone-sulphonic acid in concentrated suphuric acid in an iron container. It has been the practice in such manufacture to recover the reaction product by diluting the reaction mass to about 70% $H_2SO_4$ concentration, cooling, and filtering off and washing the precipitated 1-nitro-anthraquinone-6-sulphonic acid.

It has been found, however, that the product thus obtained lends itself but very poorly to conversion into nitro-chloro-anthraquinone. Although the replacement of the sulphonic acid group by chlorine may be carried out successfully on a laboratory scale, and although occasional batches on a plant scale will undergo conversion without difficulty, the product is at best of an erratic character and will very frequently yield a very low percentage of nitro-chloro-anthraquinone.

I have made a prolonged study of the above erratic behavior of the product, and finally discovered that the trouble is due to certain impurities in the product which are apparently inevitable when the manufacture and recovery are carried out along the lines above indicated. The nature of these impurities is not clearly understood, but they appear to be of a negatively catalytic nature, exerting an inhibiting effect on the chlorination process, since apparently very small quantities of these impurities are capable of decreasing the yield of nitro-chloro-anthraquinone to a very considerable extent, or even prevent reaction altogether.

It is accordingly an object of my invention to provide a process for the recovery and purification of nitro-anthra-quinone-sulphonic acid whereby to produce a product which is susceptible to conversion into nitro-chloro-anthraquinone with uniformly good yields. Other and further objects of this invention will appear as the description proceeds.

I have now found that if the recovery of the nitro-anthraquinone-sulphonic acid be effected from dilute sulphuric acid, say of a concentration below 50%, the product obtained lends itself readily to conversion into nitro-chloro-anthraquinone, with good yields. For practical purposes, a dilution of 40 to 45% appears best suitable, because with lower concentrations, recovery of the nitro-anthraquinone-sulphonic acid is incomplete, due to increased solubility in the mother liquor. However, a salt, such as sodium chloride or sulphate, may be added to decrease the solubility of the main compound by the well known "salting out" effect. Under these conditions the concentration of the sulphuric acid may be brought down to a very low value, say 8 to 10%.

The use of dilute suphuric acid necessitates transferring the reaction mass into a non-corrosive container, for instance, a lead lined vessel. This may be effected either by first diluting the nitration mass to about 70% $H_2SO_4$ cooling, filtering off the precipitated sulphonic acid, and then redissolving the same in a lead lined vessel containing dilute sulphuric acid, or the nitration mass, after dilution to about 70% may be transferred directly into a lead lined container, and there diluted to the desired concentration.

If an alkali-metal salt is added to the diluted mass, the organic sulphonic acid is precipitated as a salt. Otherwise the free nitro-anthraquinone-sulphonic acid is usually obtained.

My invention therefore, in its preferred form, consists of an improved process for recovering nitro-anthraquinone-sulphonic acid from its nitration mass, by diluting the nitration mass first to about 70% $H_2SO_4$; then transferring either the entire mass or the precipitated solid portion thereof into a lead lined container, diluting the mass there to a concentration below 50% sulphuric acid, or, in the alternative case, adding dilute sulphuric acid to effect a solution of the mentioned concentration, optionally adding an alkali-metal sulphate, heating the diluted mass, cooling and filtering off the crystallized nitro-anthraquinone-sulphonic acid or its salt.

Without limiting my invention to any particular procedure, the following examples are given to illustrate my specific mode of operation. Parts are by weight.

*Example 1*

The crude 1-nitro-anthraquinone-6-sulphonic acid obtained through the nitration of 500 parts of anthraquinone-2-sodium-sulphonate was suspended in a mixture of 1000 parts of 66° Bé. sulphuric acid and 4300 parts of water contained in a lead tub, and the mixture heated to 100–103° C. A hot aqueous solution of 150 parts of anhydrous sodium sulfate was added to the acid solution, the mixture cooled to 20° C., filtered, and washed with 2000 parts of water containing 96 parts of anhydrous sodium sulphate. The product was light greenish yellow in color, showing a high degree of purity and was converted to its corresponding 1-nitro-6-chloro-anthraquinone over a period of 24 hours.

Example 2

The crude 1-nitro-anthraquinone-6-sulphonic acid obtained by nitrating 500 parts of "silver salt" was suspended in a mixture of 3600 parts of water and 500 parts of 66° Bé. sulphuric acid contained in a lead tub and the mixture was heated to 98–103° C. 225 parts of anhydrous sodium sulphate dissolved in 1000 parts of boiling water were added. The mixture was then cooled slowly, allowed to stand over night, and filtered at 20–30° C. The cake of isolated material was washed with a cold solution of 96 parts of anhydrous sodium sulfate in 2000 parts of water, and exhibited the good qualities of the product in Example 1.

Example 3

The crude 1-nitro-anthraquinone-6-sulphonic acid obtained through the nitration of 200 parts of "silver salt" was slurried with 600 parts of water and the paste added to a mixture of 200 parts of 66° Bé. sulphuric acid and 3000 parts of water contained in a lead tub. The acid mixture was heated to 95–103° C. and there was added thereto a solution of 225 parts of anhydrous sodium sulphate in 1000 parts of boiling water. The mixture was then cooled to 30° C. and the material which had separated was isolated by filtration. The residue was washed with 2000 parts of a cold 4.8% solution of sodium sulphate, and possessed excellent qualities for conversion into 1-nitro-6-chloro-anthraquinone.

Example 4

The filter cake obtained from the nitration of 500 parts of potassium-alpha-sulphonate of anthraquinone in sulphuric acid and isolation of the 1-nitro-anthraquinone-5-sulphonic acid was added to a hot (100° C.) mixture of 586 parts of water and 434 parts of 66° Bé. sulphuric acid under agitation in a lead tub. The mixture was agitated for one quarter of an hour at 95° C., allowed to cool and stand over night. The 1-nitro-anthraquinone-5-sulphonic acid was isolated by filtration, and converted to its corresponding 1-nitro-5-chloroanthraquinone over a period of 11½ hours.

Example 5

The nitro-sulphonic acid filter cake from the nitration of 500 parts of "silver salt" was added to a mixture of 2300 parts of crushed ice and 1700 parts of 66° Bé. sulphuric acid (making approximately 40% sulphuric acid) contained in a lead tub. The mixture was slowly cooled from 45° C. to 20° C. under agitation and the 1-nitro-anthraquinone-6-sulphonic acid which had crystallized out was filtered off with the aid of suction. The crude nitro-sulphonic acid could not be completely converted to the 1-nitro-6-chloro-anthraquinone over a period of 56 to 64 hours, while after purification this conversion was easily completed within a period of 26½ hours.

Example 6

200 parts of "silver salt" were nitrated in 1555 parts of 96% sulphuric acid, diluted with 557 parts of cold water and poured into a mixture of 2567 parts of water and 596 parts of 100% sulphuric acid contained in a lead tub, making the final acidity approximately 40% as $H_2SO_4$. The temperature was allowed to rise to 90–95° C., then to drop slowly to 27° C. The 1-nitro-anthraquinone-6-sulphonic acid was isolated by filtering and washing with cold 40% sulphuric acid. This product was convertible to 1-nitro-6-chloro-anthraquinone within a period of 24 hours.

It will be understood that many variations and modifications are possible in my preferred mode of operation without departing from the spirit of this invention.

I claim:

1. The process of purifying a nitro-anthraquinone-sulphonic acid selected from the group consisting of 1,5- and 1,6-nitro-anthraquinone-sulphonic acid, which comprises crystallizing out the same from sulphuric acid of a concentration below 50%.

2. The process of purifying a nitro-anthraquinone-sulphonic acid selected from the group consisting of 1,5- and 1,6-nitro-anthraquinone-sulphonic acid, which comprises heating the same in sulphuric acid of below 50% concentration, cooling, and recovering the crystallized mass.

3. The process of purifying a nitro-anthraquinone-sulphonic acid selected from the group consisting of 1,5- and 1,6-nitro-anthraquinone-sulphonic acid, which comprises heating the same in a non-corrosive container in sulphuric acid of about 40 to 50% strength, cooling, and recovering the crystallized mass.

4. The process of purifying a nitro-anthraquinone-sulphonic acid selected from the group consisting of 1,5- and 1,6-nitro-anthraquinone-sulphonic acid, which comprises heating the same in a non-corrosive container in sulphuric acid of about 8 to 45% strength, cooling, adding an alkali-metal salt and recovering the precipitated alkali-metal salt of nitro-anthraquinone-sulphonic acid.

5. The process of recovering nitro-anthraquinone-sulphonic acid from the reaction mass obtained by nitrating anthraquinone-sulphonic acid in concentrated sulphuric acid, which comprises diluting the reaction mass to about 70% $H_2SO_4$ concentration, transferring the mass to a non-corrosive container, further diluting the mass to about 40–45% $H_2SO_4$ concentration, heating, cooling, and recovering the crystalline mass.

6. The process of recovering nitro-anthraquinone-sulphonic acid from the reaction mass obtained by nitrating anthraquinone-sulphonic acid in concented sulphuric acid, which comprises diluting the reaction mass to about 70% $H_2SO_4$ concentration, filtering off the crystalline mass and suspending the same in dilute sulphuric acid in a non-corrosive container, heating, cooling and recovering the crystalline mass.

7. The process of recovering 1-nitro-anthraquinone-6-sulphonic acid from the reaction mass obtained by nitrating beta-anthraquinone-sulphonic acid in concentrated sulphuric acid, which comprises diluting the reaction mass to about 70% $H_2SO_4$ concentration, transferring the mass to a lead lined container, further diluting the mass to about 40–45% H₂SO₄ concentration, heating, cooling, and recovering the crystalline mass.

8. The process of recovering 1-nitro-anthraquinone-6-sulphonic acid from the reaction mass obtained by nitrating beta-anthraquinone-sulphonic acid in concentrated sulphuric acid, which comprises diluting the reaction mass to about 70% H₂SO₄ concentration, filtering off the crystalline mass and suspending the same in dilute sulphuric acid in a lead lined container, heating, cooling, and recovering the crystalline mass.

9. The process of purifying 1-nitro-anthraquinone-6-sulphonic acid which comprises recrystallizing the same from sulphuric acid of about 40–45% concentration.

10. The process of purifying 1-nitro-anthraquinone-6-sulphonic acid which comprises cooling a hot solution of the same in sulphuric acid of about 8 to 20% concentration, in the presence of an alkali-metal sulphate, and recovering the precipitated alkali-metal salt of 1-nitro-anthraquinone-6-sulphonic acid.

WILLIAM A. ADAMSON.